Dec. 8, 1964 G. G. HARMAN, JR., ET AL 3,160,764

PULSE SHAPER EMPLOYING CHARGE-STORING SEMICONDUCTOR DEVICE

Filed Sept. 5, 1962

INVENTORS

George G. Harman, Jr.

Richard L. Raybold

BY David Robbins ATTORNEY

Alvin J. Englert AGENT 3,160,764

PULSE SHAPER EMPLOYING CHARGE-STORING SEMICONDUCTOR DEVICE

George G. Harman, Jr., Washington, D.C., and Richard L. Raybold, Alexandria, Va., assignors to the United States of America as represented by the Secretary of Commerce Filed Sept. 5, 1962, Ser. No. 221,638
10 Claims. (Cl. 307—88.5)

This invention relates to semiconductor devices, and more particularly, to semiconductor devices having charge-storing properties.

In the copending application Serial No. 203,667 entitled "Constant-Current Semiconductor Device and Method of Making It" by George G. Harman, Jr., Theodore Higier, Owen L. Meyer and Richard L. Raybold, filed June 19, 1962, and assigned to the present assignee, there is disclosed a semiconductor device comprising a body of p-type semiconductor material and at least one electrode of novel construction. The novel electrode includes a porous coating, disposed on the semiconductor body, of particles of an electrically conducting material whose work function is greater than 4 electron volts (e.v.). The coating is disposed in a gaseous ambient, and as described in said application, the device behaves as a constant-current element when the porous electrode is positive with respect to any other electrode attached to the semiconductor body.

The present invention is based on the discovery that such a semiconductor device stores charge, apparently in the form of surface states induced on the semiconductor surface by the gaseous ambient present in the porous electrode. The charge is stored while the device is quiescent and is rapidly released when a positive voltage is suddenly applied to the porous electrode. As soon as the stored charge is depleted, the rate of charge flow (current) abruptly drops to the steady state constant current value. In terms of impedance, the device literally switches from a low to a high impedance, enabling it to perform wave-shaping and harmonic-generation functions.

In accordance with the present invention, the amount of charge stored in such devices is controlled by the application of suitable biasing voltages to the porous electrode. The bias may be used to control the time width of the pulse associated with the depletion of the stored charge, so as to have the device function as a variable pulse generator. Alternatively, the bias may be selectively applied so that the stored charge is either finite or zero, in which case the device behaves as a gate. By taking an output across the device, one is also able to obtain a variable delay trigger.

Further, in accordance with the present invention, the above-described devices are modified in that the porous electrode is shaped and/or combined with other porous electrodes to provide charge release versus time functions of various shapes.

Accordingly, it is an object of this invention to provide semiconductor devices having charge-storage properties.

Another object is to provide means for controlling the amount of charge stored in such devices.

Another object is to provide semiconductor devices having charge release versus time functions of various shapes.

Other objects of the invention will become apparent when the following detailed description is considered in connection with the accompanying drawing, wherein like reference numerals refer to like parts throughout the figures thereof, and wherein.

Figure 1:
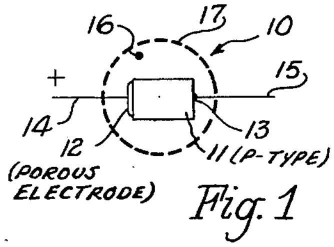
FIG. 1 is a schematic illustration of a semiconductor device employed in the present invention.

The semiconductor device 10 illustrated schematically in FIG. 1 is an exemplary embodiment of the devices disclosed in the copending application Serial No. 203,667 and employed in one aspect of the present invention. The device consists of a body 11 of p-type semiconductor material, to which are attached two electrodes 12 and 13. The electrode 12 is a porous mass or coating of finely-divided particles of an electrically conducting material whose work function is greater than approximately four electron volts (e.v.). Typical examples of such materials are carbon, silver and gold.

The porous electrode 12 is conveniently constructed by applying a paste including the above-mentioned finely-divided particles and a water-based binder to one of the surfaces of the semiconductor body, and drying the paste. The lead 14 may be pressed into the wet paste, and thus be adhesively bonded to the porous material as it dries.

The other electrode 13 and associated lead 15 may be of any nonrectifying, ohmic construction. Preferably, the electrode 13 is identical to the porous electrode 12.

The semiconductor body 11 and its electrodes are disposed in an appropriate ambient gas, as is represented by the dot 16. The ambient may be contained within a sealed envelope, as indicated by the dashed line 17, or it may be obtained from the surrounding atmosphere, by providing an open holder for the device. Suitable ambient gases include water vapor, ammonia and acetone. In the present invention, water vapor is the preferred ambient. For further details on the construction of the device 10, reference may be had to the above-mentioned copending application.

Figure 2:
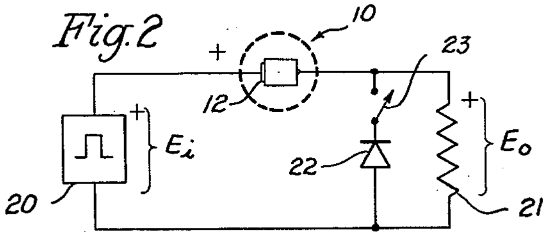
FIG. 2 is a circuit diagram illustrating the operation of the semiconductor device of FIG. 1.
Figure 3:
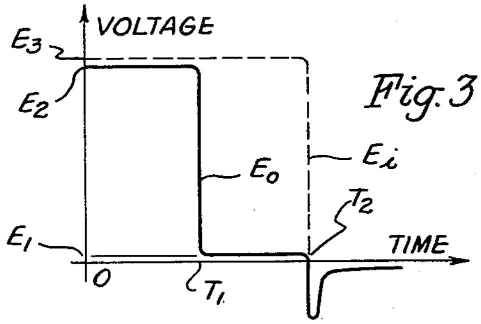
FIG. 3 is a graphic illustration of the voltages indicated in FIG. 2.

The present invention is based on the discovery that the impedance of the device 10 is very low during an initial brief period, after which it abruptly switches to the much higher steady-state value. To illustrate this phenomena, the device 10 of FIG. 1 is shown in FIG. 2 as being connected in series with a voltage pulse source 20 and a resistive load 21, with the positive porous electrode 12 connected to the positive terminal of the pulse source 20. As illustrated in FIG. 3, the pulse $E_1$ supplied by the source 20 is rectangular, with a negligible rise time, a height $E_3$ and a time width $T_2$. The voltage $E_0$ developed across the load 21 quickly rises to the height $E_2$ that is almost equal to the height $E_3$, and remains there until the $T_1$. During this first time interval, the impedance of the device 10, FIG. 2, is very low, and is due to the resistances of the electrodes and semiconductor bulk.

At the time $E_1$, the output of voltage $E_o$ abruptly drops to the very low value $E_1$. The value $E_1$ is found to be equal to the voltage drop associated with the constant current that is characteristic of the device 10 and the resistance of the load 21. The output voltage $E_o$ remains at this value until such time $T_2$ as the input pulse $E_i$ terminates; then it goes negative and subsides to zero. The negative voltage represents a recharging of the device 10. By shunting the load 21, FIG. 2, with the diode 22 arranged to have its cathode connected to the negative electrode of the device 10 when the switch 23 is closed, this negative-going portion of output voltage may be prevented from appearing across the load 21. The shape of the output voltage $E_o$ then is essentially only the initial pulse of height $E_2$ that extends to time $T_1$. As will readily be appreciated, the device 10 thus functions to generate or shape short pulses from longer ones. The ability of the device 10 to generate harmonics is self-evident.

The time $T_1$, FIG. 3, at which the output voltage $E_o$ essentially terminates may be calculated in terms of the charge transported by the device 10 during the time period extending from zero to $T_1$. During this period, the current in the circuit of FIG. 2 is constant and is given by $$\frac{E_3}{R_{10}+R_{21}} \qquad (1)$$

where $E_3$ is the amplitude of the voltage pulse supplied by the source 20, $R_{10}$ is the above-mentioned resistance of the electrodes and semiconductor bulk, and $R_{21}$ is the resistance of the load 21. Since this current corresponds to the constant flow of Q-charge over a time period equal to $T_1$, we may write $$T_1=Q\frac{R_{10}+R_{21}}{E_3} \qquad (2)$$

From this expression, the product of the switching time $T_1$ and input amplitude $E_3$ should be a constant if the stored charge Q is a constant.

Figure 4:
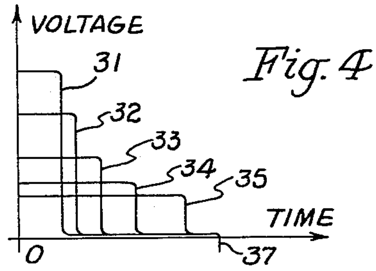
FIG. 4 is a graphic illustration similar to FIG. 3, and shows the effect of varying the amplitude of the applied voltage pulses.

FIG. 4 illustrates a family of output voltage curves 31–35 obtained by varying the amplitude of the voltage pulses supplied by the source 20 of FIG. 2. The width of the input pulses in all cases extended to the slight negative pip 37. The widths of the pulses 31–35 vary inversely with their heights, demonstrating that the stored charge Q is indeed constant. As will be evident from these curves, the device 10 provides a convenient means for converting pulse height information into time data.

The value of the charge Q stored by the semiconductor device 10 varies directly with the area of the semiconductor surface portion covered by the porous electrode, indicating that the charge is due to surface states induced on the semiconductor surface by the ambient gas present in the porous coating. It is also dependent on the type of p-type semiconductor used, the type of porous electrode used, and the type and concentration of the ambient. In order of magnitude, the charge stored is $10^{-7}$ coulomb per square centimeter of electrode.

Figure 5:
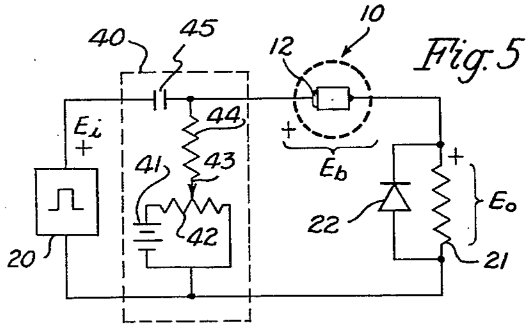
FIG. 5 is a modification of the circuit of FIG. 2 to include means for biasing the semiconductor device thereof.

FIG. 5 illustrates the modification of the circuit of FIG. 2 to include means 40 for controlling the amount of charge stored by the device 10. These means 40 include a biasing battery 41 shunted by a dropping resistor 42. The variable tap 43 of the dropping resistor is connected via a current-limiting resistor 44 to the positive terminal of the device 10, while the negative terminal of the battery 41 is connected to the negative terminal of the source 20. To isolate the battery 41 from the pulse source 20, a capacitor 45 is connected between the source and the junction of the resistor 44 and device 10. As will readily be appreciated, movement of the tap 43 from right to left serves to increase the bias voltage $E_b$ impressed across the device 10.

Figure 6:
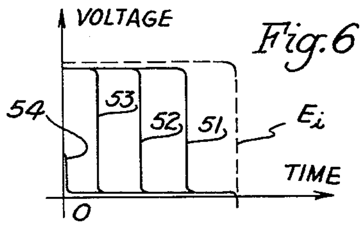
FIG. 6 is a graphic illustration of the effect of the biasing means of FIG. 5.

FIG. 6 illustrates the output voltage $E_o$, FIG. 5, as a function of the bias voltage $E_b$. The curve 51 represents $E_o$ for zero bias, that is, $E_b$ of FIG. 5 equal to zero. As the bias is increased, with a constant amplitude $E_i$ of pulse input, the width of the resulting pulse is reduced, as shown by curve 52. The amplitude of the curve 52 is substantially unaffected. Hence, the charge represented by the area under the curve 52 has been decreased over that represented by curve 51. Further increase in the bias voltage results in a further decrease in the amount of stored charge, as illustrated by curve 53. Finally, when the bias is sufficiently positive, no flow of stored charge is observable. The output voltage merely exhibits a small capacitive spike 54 at the initiation of the input pulse $E_i$. Such spike appears to be due solely to the capacitance between the electrodes of the device 10.

Figures 7, 11:
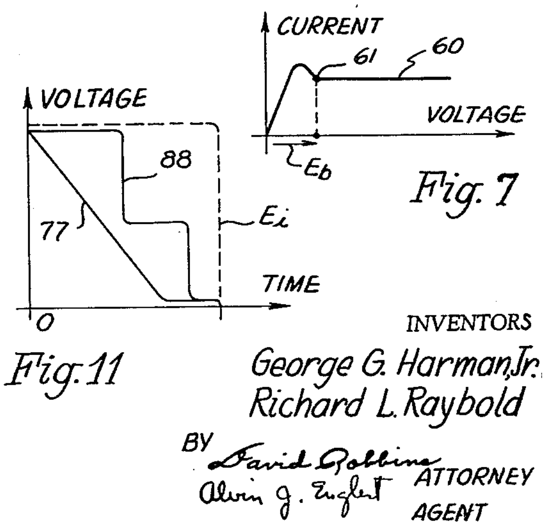
FIG. 7 is a graphic illustration of the characteristic current versus voltage behaviour of the semiconductor device shown in FIGS. 1, 2 and 5.
FIG. 11 is a graphic illustration of the voltage versus time characteristics of the devices shown in FIGS. 8, 9 and 10.

To prevent the device 10, FIG. 5, from storing charge, the bias voltage $E_b$ must be equal to or greater than the voltage defining the transition between the linear rise and constant current portions of the characteristic current voltage curve for the device 10. In FIG. 7, the minimum bias voltage for this condition is illustrated at point 61 of the characteristic curve 60.

The application of negative (rather than positive) bias voltage to the porous electrode of the device 10, FIG. 5, does not appreciably change the output voltage from that illustrated by curve 51, FIG. 6, wherein the bias voltage is zero. The pulse width is extended a slight amount (not shown), which extension is thought to be due to charge injected into the semiconductor depletion region by the negative bias.

As will readily be appreciated by those skilled in the art, the biasing means 40 for controlling the amount of stored charge may assume configurations other than the particular embodiment illustrated in FIG. 5. For example, the simple insertion of a battery (not shown) in series with the positive, porous electrode of the device 10 will serve to provide the bias voltage $E_b$, FIG. 5. Also by way of example, the bias voltage $E_b$ may be established by various external control circuits. In the latter instance, the bias means may be such as to either permit or prevent the device 10 of FIG. 5 from storing charge, in which case, the device 10 performs as an electrically-controllable switch or gate.

Those skilled in the art will further appreciate that the provision of the device 10 with biasing means in accordance with the present invention enables it to perform a plurality of functions. Basically, the bias enables one to control the width of the output pulses, and thus generate variable-width pulses. Furthermore, by taking an output across the device 10 of FIG. 5, one is able to obtain a voltage that is substantially zero for a variable time period, after which the voltage is nearly equal to the input pulse voltage. Such a device will be recognized as a variable delay trigger.

Figure 8:
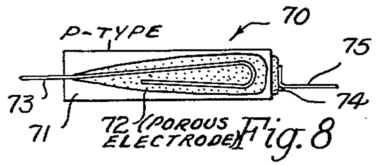
FIG. 8 is a top plan view of a modified semiconductor device.
Figure 9:
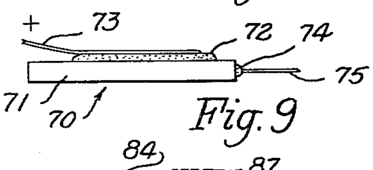
FIG. 9 is a front elevational view of the device shown in FIG. 8.

In accordance with another aspect of the present invention, the semiconductor device 10 of FIGS. 1, 2 and 5 is modified in that the porous electrode 12 thereof is shaped and/or combined with other porous electrodes so as to provide various charge release versus time functions. An exemplary embodiment 70 of this modification is illustrated in FIGS. 8 and 9, wherein the p-type semiconductor body 71 is in the form of a long, thin slice. Disposed on the large top surface thereof is a long, generally triangular-shaped porous electrode 72, to which the positive lead 73 is attached. The lead 73 is bent into a generaly hook-shaped configuration to provide a substantially uniform resistance between all portions of the porous electrode 72 and the lead 73. As an alternative to this configuration, a triangular-shaped wire screen or mesh (not shown) could be disposed over the porous electrode 72, and the lead 73 connected thereto. To complete the device 70, a second, negative electrode 74 and associated lead 75 are connected to the small end surface that is adjacent the base of the triangular electrode 72. The electrode 74 preferably is porous, although it may assume any nonrectifying, ohmic design. As described in connection with the device 10, the positive porous electrode 72 must be disposed in an ambient gas, preferably water vapor, to induce surface states on the semiconductor surface beneath the porous electrode 72.

To obtain the charge stored by the device 70 of FIGS. 8 and 9, a positive pulse $E_1$ (FIG. 11) is applied to the positive lead 73. If the charge is allowed to flow through a load similar to the load 21 shown in FIG. 2, the voltage illustrated by the curve 77 of FIG. 11 is developed across the load. The curve 77 is a sawtooth having a very fast rise time, and a slow, substantially linear decay. In contrast to the flat-topped pulse $E_o$, FIG. 3, produced by the device 10 of FIG. 2, the device 70 generates a decaying voltage, apparently because the electric field established in the semiconductor body 71 by the applied voltage pulse $E_1$ is never uniform over the full area of the porous electrode 72. When the pulse $E_1$ is first applied, it appears that the field is concentrated between the right-hand portion of the porous electrode 72, FIGS. 8 and 9, and the negative electrode 74. As the charge is depleted from this portion of the porous electrode 72, the field is forced towards the left-hand portion of the porous electrode. Consequently, the charge flow is lessened, causing the voltage developed across the load to decay. The field is shifted from right to left until all of the stored charge is removed, after which the output voltage 77 drops to the characteristically low value that terminates with the cessation of the applied pulse $E_1$.

From the foregoing, it will be evident that the semiconductor device 70 provides a convenient means for generating sawtooth (triangular) waveforms from rectangular voltage pulses. It will also be evident that waveforms of other shapes may be obtained, by substituting different shapes for the triangular shape of the porous electrode 72. For example, by forming the porous electrode 72 of FIG. 8 in the shape of a long rectangle an exponentially-decaying rather than a linearly-decaying waveform may be readily obtained.

Figure 10:
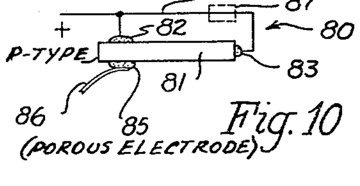
FIG. 10 is a front elevational view similar to FIG. 9 of a further modification of the semiconductor device.

FIG. 10 illustrates a further embodiment 80 of the present invention wherein the porous electrode consists of a plurality of coatings that are electrically connected together so as to produce a step-shaped waveform. Disposed on the long, thin rectangular body 81 of p-type semiconductor material are two porous electrodes 82 and 83 that are constructed in the manner described in connection with the porous electrode 12 of FIG. 1. The electrode 82 covers a small portion of one end of the top surface of the body 81, while the electrode 83 covers the end surface that is more remote from the electrode 82. These two electrodes 82, 83 are interconnected by the lead 84, which forms the positive terminal of the device. On the bottom surface of the body 81, opposite the electrode 82, is disposed a negative electrode 85 and associated lead 86. This negative electrode preferably is of the same porous construction as electrodes 82, 83, although other nonrectifying, ohmic constructions will suffice.

The substitution of the device 80 (wherein a suitable ambient is provided) for the device 10 in the circuit of FIG. 2, results in the output voltage waveform 88 illustrated in FIG. 11. The waveform is step-shaped, apparently because the electric field is applied substantially only to the electrode 82 until the stored charge associated therewith is depleted, after which the field switches to the electrode 83 that is more remote from the negative electrode 85. The voltage 88 apparently drops to the second level or step when the field switches. As will readily be appreciated, the heights and widths of the two steps comprising the waveform 88 may be varied by adjusting the relative areas and spacings of the two porous electrodes 82, 83. It will also be evident that the insertion of different impedances into the leads connected to these electrodes will affect the relative shapes of the steps. Furthermore, it will be evident that the insertion of a load, indicated at 87, in the lead connecting electrodes 82 and 83 will cause the pulse developed across the load 87 to be delayed with respect to the applied pulse, the amount of delay being controllable by biasing the electrode 82 in the manner described in connection with the means 40 of FIG. 5.

Obviously, many modifications and variations of the present invention are possible in the light of the above teachings. It is therefore to be understood, that within the scope of the appended claims, the invention may be practiced otherwise than as specifically described.

What is claimed is:

1. In combination, means for storing charge comprising a body of p-type semiconductor material, a porous electrode disposed on said body, said body and said porous electrode being disposed in an ambient gas which induces surface states on said body, means for utilizing said charge, and means for releasing said charge into said utilizing means.

2. The combination set forth in claim 1, wherein means are provided for controlling the amount of charge stored by said storing means.

3. The combination set forth in claim 2, wherein said controlling means include a source of direct-current voltage connected to apply a positive voltage to said porous electrode.

4. The combination set forth in claim 1, wherein said semiconductor body comprises a long, thin slice, said porous electrode being disposed on the long top surface thereof, said body having another electrode disposed on one of the small end surfaces thereof.

5. The combination set forth in claim 4, wherein said porous electrode is generally triangular-shaped.

6. The combination set forth in claim 1, wherein said semiconductor body comprises a long, thin slice, said porous electrode being disposed at one end of the long top surface thereof, a second porous electrode disposed on the small end surface of said semiconductor body that is opposite said one end, means for connecting said porous electrodes together, a third electrode disposed on the long bottom surface opposite said porous electrode on said top surface.

7. The combination set forth in claim 1, wherein said porous electrode comprises a coating of finely-divided particles of an electrically-conducting material whose work function is greater than approximately four electron volts.

8. The combination set forth in claim 1, wherein said ambient gas includes water vapor.

9. The combination set forth in claim 1, wherein said releasing means include a source of voltage pulses.

10. The combination set forth in claim 1, wherein said utilizing means are shunted by a diode to prevent the recharging current from passing therethrough.

No references cited.

ARTHUR GAUSS, *Primary Examiner.*